United States Patent [19]
McGowan et al.

[11] Patent Number: 5,357,184
[45] Date of Patent: Oct. 18, 1994

[54] FUSE SYSTEM FOR A MULTIPLE BATTERY CHARGER

[75] Inventors: Michael D. McGowan, Blackjack; Wayne R. Humphrey, St. Louis, both of Mo.

[73] Assignee: Associated Equipment Corporation, St. Louis, Mo.

[21] Appl. No.: 875,374

[22] Filed: Apr. 29, 1992

[51] Int. Cl.$^5$ ............... H01M 10/46; H02B 1/01
[52] U.S. Cl. ................................. 320/2; 361/833
[58] Field of Search .............. 320/2, 15, 54, 55; 361/341, 349, 360, 361, 429–431

[56] References Cited
U.S. PATENT DOCUMENTS

| | | | |
|---|---|---|---|
| 788,109 | 4/1905 | Krantz . | |
| 1,454,033 | 5/1923 | Baird | 361/429 |
| 1,729,109 | 9/1929 | Haskins | 361/429 |
| 1,732,346 | 10/1929 | Waller | 361/429 |
| 3,313,995 | 4/1967 | Bach et al. | 320/25 |
| 3,609,506 | 9/1971 | Frezzolini et al. | 320/39 |
| 3,848,173 | 11/1974 | Hase | 320/23 |
| 3,855,516 | 12/1974 | Fairchild | 320/22 |
| 4,032,828 | 6/1977 | Strobl et al. | 320/39 |
| 4,554,574 | 11/1985 | Wright | 357/74 |

OTHER PUBLICATIONS

A booklet entitled Fuseology, a Handbook on Fuses issued by Bussmann Mfg. Division, McGraw-Edison Co., Twenty-third Edition, copyright, 1949.
Associated Equipment, Corporation's Model 6083 Battery Rack, 1983–1987.
Associated Equipment, Corporation's Prototype Battery Rack, 1989.

*Primary Examiner*—R. J. Hickey
*Attorney, Agent, or Firm*—Senniger, Powers, Leavitt & Roedel

[57] ABSTRACT

A fuse system for a battery charger provides fuse links for safely charging a plurality of batteries in parallel connection. A fuse system is used with a power supply comprising a positive and a negative terminal. The positive and negative terminals of the power supply are connected respectively to separate positive and negative bus bars of the fuse system. A plurality of connectors separately connect the positive bus bar to the positive terminals on the batteries and separately connect the negative bus bar to the negative terminals on the batteries. Each connector includes a fuse link. The fuse link comprises a plurality of fusible conductors connected in parallel. A transparent cover over the fuse link protects the operator and enables the visual inspection of the condition of the fuse link.

18 Claims, 3 Drawing Sheets

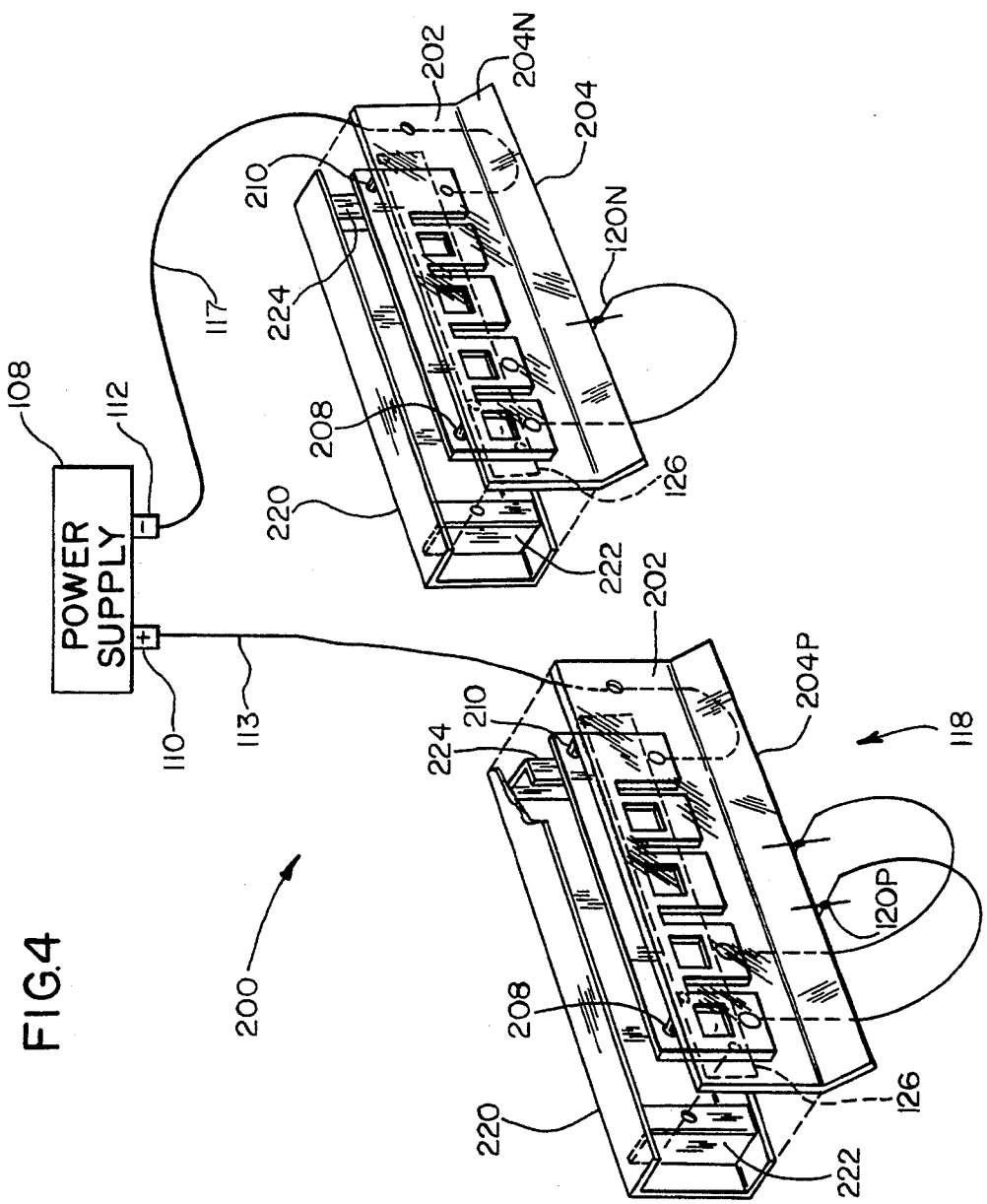

FUSE SYSTEM FOR A MULTIPLE BATTERY CHARGER

BACKGROUND OF THE INVENTION

This invention relates to a fuse system for a battery charger for simultaneously charging a plurality of batteries in parallel connection, and more particularly such a fuse system including fuse links for safely limiting the electrical current which charges each battery.

Fused battery chargers are well known in the prior art. For example, U.S. Pat. Nos. 3,313,995 and 4,032,828 disclose fused devices which charge storage batteries. However, such devices cannot simultaneously charge a plurality of batteries in parallel. Furthermore, it has been found that a user may accidentally connect a battery to a charger in reverse polarity to the terminals on the charger. The user may also connect a battery to the same terminal of the charger, thus shorting the battery through the terminal. The user may also short circuit a charger by connecting together two charger terminals of opposite polarity. The battery may also short out during charging and thus draw excessive electrical current from the charger. Whenever any of these conditions occurs, the excessive electrical currents which result present a hazard which may cause an explosion or personal injury. There is a need for a fuse system for a multiple battery charger which, if such a condition is presented, minimizes excessive currents quickly and safely so that a dangerous situation is avoided.

SUMMARY OF THE INVENTION

Among the several objects of this invention may be noted time provision of a fuse system for a battery charger for simultaneously charging a plurality of batteries in parallel connection while preventing excess current flows in the event a battery is improperly connected or defective, thereby avoiding a potential explosion or personal injury; the provision of such a fuse system which is economical to manufacture; the provision of such a fuse system which is durable and reliable in operation; and the provision of such a fuse system which is easy to use.

In one form, the invention comprises a fuse system for a battery charger for charging a plurality of batteries, each having first and second terminals. The charger includes a power supply having first and second terminals corresponding to the first and second terminals, respectively, of the battery and a bus bar. Means connects the first terminal of the power supply to the bus bar. A plurality of connector means, each said connector means corresponding to one of the plurality of batteries, separately connects the bus bar to the first terminal of the corresponding battery. Each of the plurality of connector means comprises means for engaging the first terminal of the corresponding battery, an electrical conductor, and a fuse link in series with the electrical conductor. The conductor and link are connected between the engaging means and the bus bar. Means connects the second terminal of the power supply to the second terminal of each of the plurality of batteries, so that the plurality of batteries are charged in parallel connection. The battery charger may include means connecting the second terminal of the power supply to the second terminal on each of the plurality of batteries such as a second bus bar and a second fuse link. The first and second fuse links may further comprise a plurality of fusible conductors connected in parallel. The fuse links and the bus bar may be formed from a single piece of conductive material.

In another form, the invention comprises a battery charger for charging a plurality of batteries, each having a positive and a negative terminal. The charger includes a power supply having positive and negative terminals, a positive bus bar, and a negative bus bar. Means connects the positive terminal of the power supply to the positive bus bar. Means connects the negative terminal of the power supply to the negative bus bar. A plurality of positive connector means, each said positive connector means corresponding to one of the plurality of batteries, separately connects the positive bus bar to the positive terminal of the corresponding battery. A plurality of negative connector means, each negative connector means corresponding to one of the plurality of batteries, separately connects the negative bus bar to the negative terminal of the corresponding battery. Each of the positive and negative connector means comprises: means for engaging a terminal on a battery, an electrical conductor, and a fuse link in series with the electrical conductor. The conductor and the link are connected between the engaging means and the bus bar whereby the plurality of batteries are charged simultaneously in parallel connection.

BRIEF DESCRIPTION OF THE DRAWINGS

FIG. 4 shows a transparent safety cover over the fuse links and shows an insulator bar for safely storing the connectors.

DETAILED DESCRIPTION OF THE PREFERRED EMBODIMENTS

Figure 1:
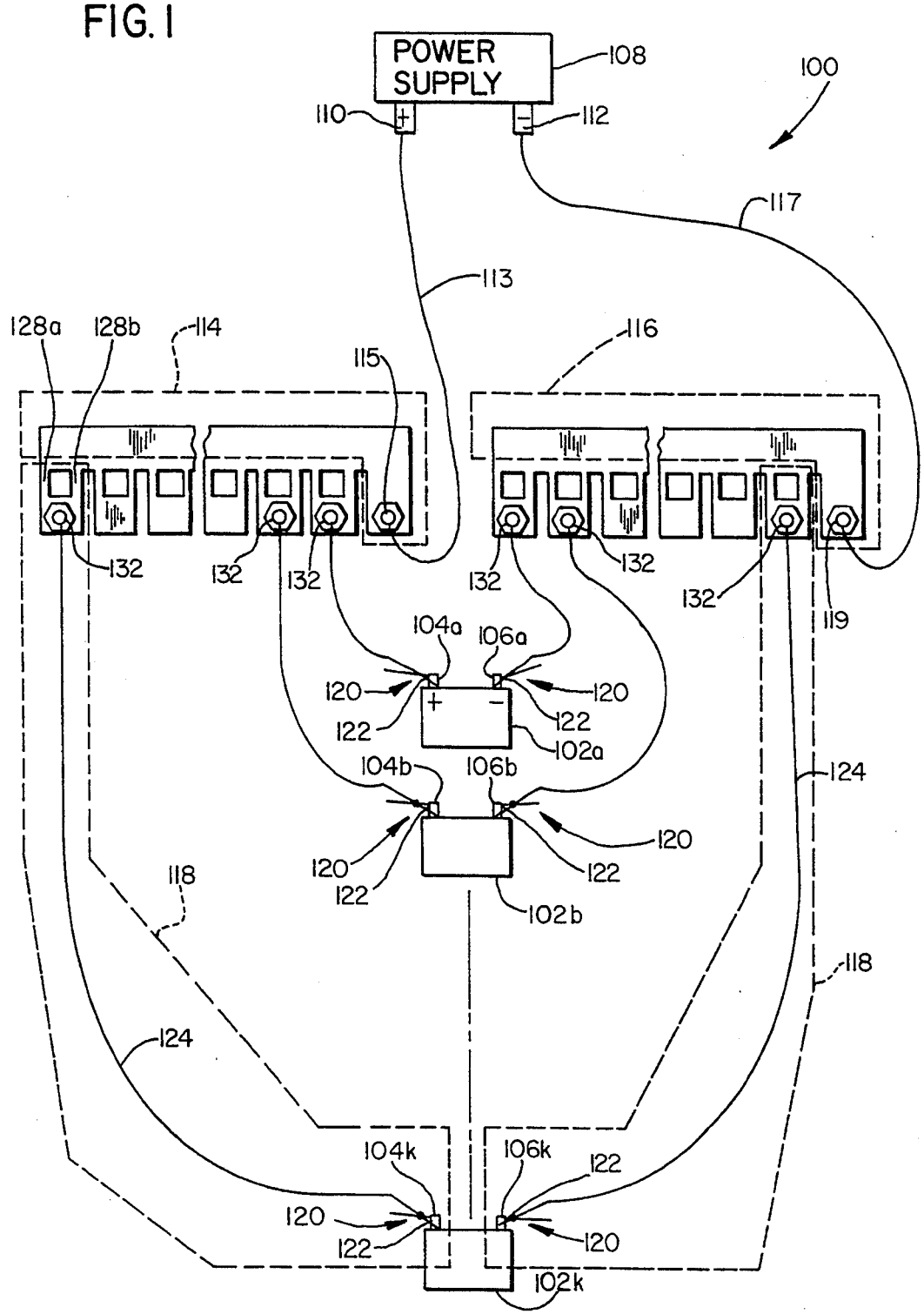
FIG. 1 is a schematic view showing a fuse system of this invention for charging a plurality of batteries in parallel connection.

Referring now to the drawings, FIG. 1 shows a battery charger 100 charging a plurality of batteries 102a through 102k in parallel connection. Each battery 102a through 102k contains a first terminal 104a through 104k and a second terminal 106a through 106k, respectively.

The battery charger comprises a power supply 108 having a first, positive terminal 110 and a second, negative terminal 112 corresponding respectively to the first, positive terminal 104 and second, negative terminal 106 of the batteries. The first terminal 110 of the power supply 108 is connected via cable 113 to a first, positive bus bar shown by dashed line 114 at terminal 115. The second, negative terminal 112 of the power supply 108 is connected via cable 117 to a second bus bar shown by dashed line 116 at terminal 119. A plurality of connectors, one of which is representatively shown by dashed line 118, provide for the separate connection of the bus bars 114 and 116 to the respective terminals 104 and 106 of the batteries 102. Although FIG. 1 illustrates the invention as part of a battery charger, it is contemplated that the invention may be in the form of a fuse system provided as a bit to retrofit a preexisting battery charger. For example, power supply 108 may not be a part of the invention and the remaining portions of the charger 100 illustrated in FIG. 1 would be manufactured or sold as a bit. In this case, cables 113 and 117 would be configured to engage the particular power supply with which the bit would be connected.

Figure 2:
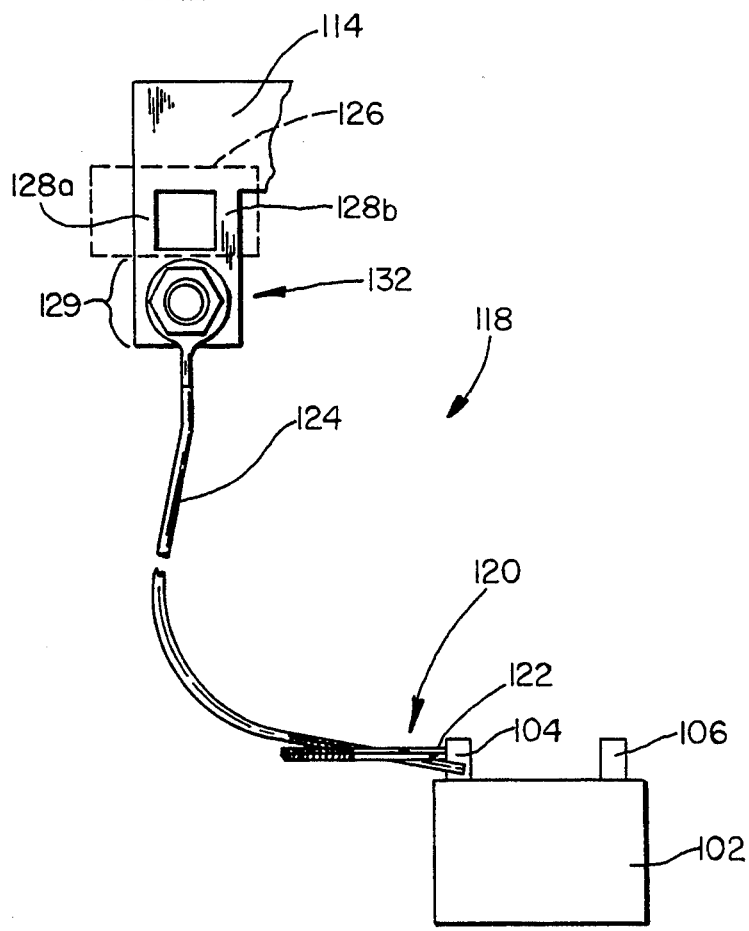
FIG. 2 is an isolated view of a representative connector for connecting a bus bar to a battery terminal.

FIG. 2 illustrates an isolated view of a representative connector 118 shown connected to bus bar 114. Each of the plurality of connectors 118 includes a hand operated clamp 120 containing spring-loaded jaws 122 for engaging a terminal 104 or 106 on a battery 102. Each connector 118 further includes an electrical conductor 124 and a fuse link shown within dashed line 126. The electrical conductor 124 and the fuse link 126 are connected in series between the hand operated clamp 120 and the bus bar 114.

Fuse link 126 is preferably configured in size, shape and/or cross-section to melt when carrying more than a safe amount of current. For example, fuse link 126 may provide an open circuit and become nonconductive in response to a current greater than 200 amperes. Fuse link 126 is constructed of a plurality of fusible conductors 128a and 128b connected in parallel. The resulting shape advantageously provides greater physical strength than a single fuse member which helps prevent distortion of the shape during assembly. Each link 128 is 0.5 inches long, 0.125 inches across, and 0.025 inches thick.

Figure 3:
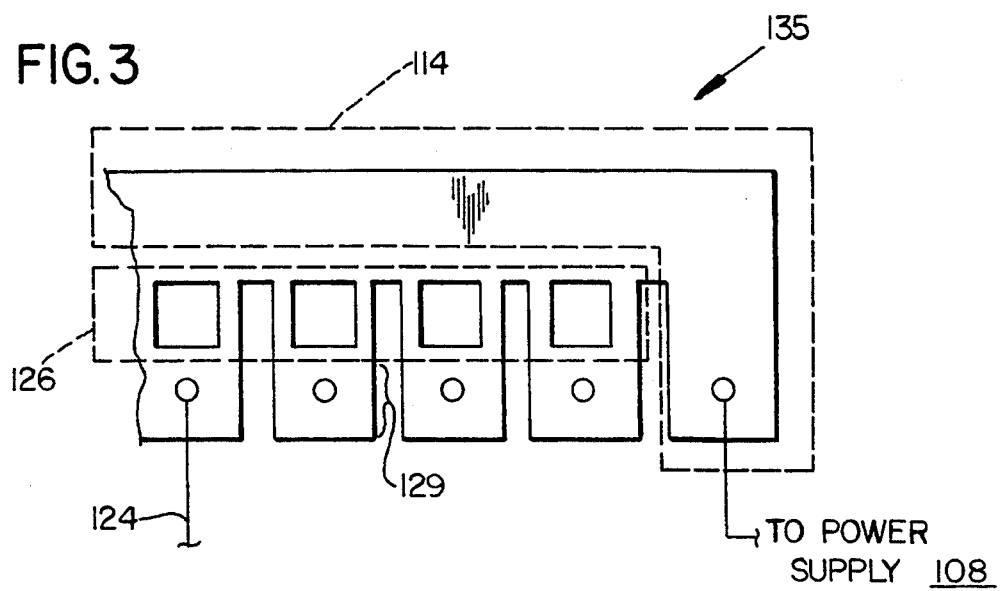
FIG. 3 shows a preferred design for integrally forming a plurality of fuse links and a bus bar from a single sheet of conductive material.

As shown in FIG. 3, fuse link 126 and representative bus bar 114 are integrally formed from a single sheet of conductive material 135. The use of a single sheet of conductive material 135 for manufacturing fuse link 126 and bus bar 114 provides an economical and safe charging system. The sheet may comprise a 0.025 inch thick sheet of Alloy 750 Zinc as commonly sold by the Ball Manufacturing Co. Bus bar 114 delivers the charging current from the power supply 108 through each of the projecting fuse links 126. Each of the fuse links 126 terminates in a terminal 132 adapted to be connected to the electrical conductors 124. As illustrated in FIG. 2, the terminal 132 may comprise a nut and bolt connected to the terminal area 129 at the end of the fuse links 128a and 128b and engaging a ring terminal crimped and/or soldered to one end of cable 124.

FIG. 4 shows one preferred embodiment of the electrical components of the invention as part of a battery charging system 200. Each single sheet of conductive material 135 containing fuse links 126 may be fastened to a nonconductive structural support 220. Support 220 provides mechanical strength so that fuse links 126 are not twisted or bent. Fuse links 126 are positioned behind a transparent cover 202 which is closed at the sides and held in place over the links 126 by side pieces 222 and 224. This protects the user from burning embers which may be caused by melting of the fuse links 126 and enables the user to visually determine the physical condition of each of the fuse links 126. Cover 202 is secured in place to the bus bar by suitable fasteners 208 and 210. Battery charging system 200 may also include a bar made of an insulating material conveniently located so that connectors 118 may mechanically engage the bar when connectors 118 are not in use. For example, cover 202 may have a flange 204 projecting outwardly from its lower edge. As a result, positive clamps 120F (which are generally red in color) may be connected to positive flange 202P. Similarly, negative clamps 120N (which are generally black in color) may be connected to negative flange 202N.

In operation, a battery charger of the present invention may be used to charge simultaneously a plurality of batteries 102. All operator begins by plugging the battery charger into an appropriate electrical outlet and turning the battery charger "on". The operator next positions the batteries 102 to be charged adjacent to the battery charger. The operator connects one of the connectors 118 from the positive bus bar 114 to the positive terminal 104a on the first battery 102a and connects one of the connectors 118 from the negative bus bar 116 to the negative terminal 106a on the first battery 102a. Similar electrical connections are made for the remaining batteries 102 to be charged using the remaining positive and negative connectors 118. It will be noted that any of the several positive and negative connectors 118 may be used for a particular battery 102 so long as the correct polarity is maintained. After the last battery 102 has been so connected, it will be seen that all of the batteries 102 are charged in parallel connection.

It has been found that a user may accidentally connect the terminals 104 and 106 of a battery 102 in reverse polarity to the terminals 110 and 112 of the power supply 108. Should this dangerous situation occur with the present invention, the fuse link 126 on either or both of the connectors 118 will be rendered nonconductive. Operators have also been known to inadvertently connect both terminals 104 and 106 of a battery 102 to the same bus bar 114 or 116. This situation is dangerous in that it short circuits the battery 102 through the bus bar 114 or 116. With the present invention, this short circuit would create sufficient current to open circuit the fuse link 126 in either or both of the connectors 118. Experience has further demonstrated that a battery 102 may have an internal short circuit during charging or a user may directly connect two connectors 118 of opposite polarity. The resulting high currents in the charging system and through the battery again present a dangerous situation. Should this happen with the present invention, the fuse link 126 in either or both of the connectors 118 would again be rendered nonconductive thus avoiding a dangerous condition.

The present invention thus safely provides a reliable low cost battery charging system which remains operational even after one particular set of connections to a battery have conducted excessive current levels.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A fuse system for a battery charger for charging a plurality of batteries, each battery having first and second terminals, wherein the charger includes a power supply having first and second terminals corresponding to the first and second terminals, respectively, of the batteries, said fuse system comprising:

first and second bus bars;

means for connecting the first terminal of the power supply to the first bus bar and for connecting the second terminal of the power supply to the second bus bar; and a plurality of connector means for separately connecting the first bus bar to the first terminal on each of the batteries and for separately connecting the second bus bar to the second terminal on each of the batteries;

wherein each of the plurality of connector means comprises:

means for engaging one of the terminals of the corresponding battery;

an electrical conductor; and a fuse link in series with the electrical conductor, said conductor and said link connected between the engaging means and the respective bus bar; and wherein at least some of the fuse links and at least one of the bus bars are formed from a conductive material comprising:

a central conduction member;

a plurality of terminals adapted to be connected to the electrical conductors; and a plurality of said fuse links, each projecting from the central conduction member and terminating in one of the terminals, whereby the plurality of batteries are charged simultaneously in parallel connection.

2. The fuse system of claim 1 wherein the fuse links further comprise a conductive member adapted to provide an open circuit and become nonconductive in response to a current greater than approximately 200 amperes.

3. The fuse system of claim 1 further comprising a transport cover over each fuse link and over a portion of the central conduction member from which the fuse link projects, whereby a use is protected from each fuse link and may visually inspect the condition of each fuse link.

4. A fuse system for a battery charger for charging a plurality of batteries, each battery having first and second terminals, wherein the charger includes a power supply having first and second terminals corresponding to the first and second terminals, respectively, of the batteries, said fuse system comprising:

first and second bus bars;

means for connecting the first terminal of the power supply to the first bus bar and for connecting the second terminal of the power supply to the second bus bar; and a plurality of connector means for separately connecting the first bus bar to the first terminal on each of the batteries and for separately connecting the second bus bar to the second terminal on each of the batteries;

wherein each of the plurality of connector means comprises:

means for engaging one of the terminals of the corresponding battery;

an electrical conductor; and a fuse link in series with the electrical conductor, said conductor and said link connected between the engaging means and the respective bus bar; and wherein at least one of the bus bars comprises a central conduction member having said fuse links projecting therefrom for connection to said electrical conductors; and a transport cover over each fuse link and over a portion of the central conduction member from which the fuse link projects wherein the transparent cover includes a flange to which each of the engaging means may be mechanically connected when not in use, whereby a user is protected from each fuse link and may visually inspect the condition of each fuse link, whereby each of the engaging means may be safely stored and electrically insulated from each other, and whereby the plurality of batteries are charged simultaneously in parallel connection.

5. The fuse system of claim 1 wherein the fuse links further comprise a plurality of conductors of fusible zinc material connected in parallel.

6. The fuse system of claim 1 wherein the conductive material further comprises a long bar with a plurality of fuse links projecting transversely, the fuse links further comprising a plurality of fusible members connected in parallel between the central conduction member and the terminal, wherein the fuse links and the bus bar are formed from a single piece of conductive material.

7. A battery charger for charging a plurality of batteries, each having first and second terminals, said charger comprising:

a power supply having first and second terminals corresponding to the first and second terminals, respectively, of the batteries;

first and second bus bars;

means for connecting the first terminal of the power supply to the first bus bar and for connecting the second terminal of the power supply to the second bus bar; and a plurality of connector means for separately connecting the first bus bar to the first terminal on each of the batteries and for separately connecting the second bus bar to the second terminal on each of the batteries;

wherein each of the plurality of connector means comprises:

means for engaging one of the terminals of the corresponding battery;

an electrical conductor; and a fuse link in series with the electrical conductor, said conductor and said link connected between the engaging means and the respective bus bar; and wherein at least some of the fuse links and at least one of the bus bars are formed from a conductive material comprising:

a central conduction member;

a plurality of terminals adapted to be connected to the electrical conductors; and a plurality of said links fuse links, each projecting from the central conduction member and terminating in one of the terminals, whereby the plurality of batteries are charged simultaneously in parallel connection.

8. The battery charger of claim 7, wherein the fuse links further comprise a conductive member adapted to provide an open circuit and become nonconductive in response to a current greater than approximately 200 amperes.

9. The battery charger of claim 7 further comprising a transparent cover over each fuse link and over a portion of the central conduction member from which the fuse link projects, whereby a user is protected from each fuse link and may visually inspect the condition of each fuse link.

10. A battery charger for charging a plurality of batteries, each having first and second terminals, said charger comprising:

a power supply having first and second terminals corresponding to the first and second terminals, respectively, of the batteries;

first and second bus bars;

means for connecting the first terminal of the power supply to the first bus bar and for connecting the second terminal of the power supply to the second bus bar; and a plurality of connector means for separately connecting the first bus bar to the first terminal on each of the batteries and for separately connecting the second bus bar to the second terminal on each of the batteries;

wherein each of the plurality of connector means comprises:

means for engaging one of the terminals of the corresponding battery;

an electrical conductor; and a fuse link in series with the electrical conductor, said conductor and said link connected between the engaging means and the respective bus bar; and wherein at least one of the bus bars comprises a central conduction member having said fuse links projecting therefrom for connection to said electrical conductors, and a transparent cover over each fuse link and over a portion of the central conduction member from which the fuse link projects wherein the transparent cover includes a flange to which each of the engaging means may be mechanically connected when not in use, whereby a user is protected from each fuse link and may visually inspect the condition of each fuse link, whereby each of the engaging means may be safely stored and electrical insulated from each other, and whereby the plurality of batteries are charged simultaneously in parallel connection.

11. The battery charger of claim 7 wherein the fuse links further comprise a plurality of conductors of fusible zinc material connected in parallel.

12. The battery charger of claim 7 wherein the conductive material further comprises a long bar with a plurality of fuse links projecting transversely, the fuse links further comprising a plurality of fusible members connected in parallel between the central conduction member and the terminal, wherein the fuse links and the bus bar are formed from a single piece of conductive material.

13. A battery charger for charging a plurality of batteries, each having a positive and a negative terminal, said charger comprising:

a power supply having positive and negative terminals;

a positive bus bar;

a negative bus bar;

means for connective the positive terminal of the power supply to the positive bus bar;

means for connecting the negative terminal of the power supply to the negative bus bar;

a plurality of positive connector means, each said positive connector means corresponding to one of the plurality of batteries for separately connecting the positive bus bar to the positive terminal of the corresponding battery; and a plurality of negative connector means, each said negative connector means corresponding to one of the plurality of batteries for separately connecting the negative bus bar to the negative terminal of the corresponding battery;

wherein at least some of the positive and negative connector means each comprise:

means for engaging a terminal on a battery; and electrical conductor; and a fuse link in series with the electrical conductor, said conductor and said link connected between the engaging means and the bus bar; and wherein at least some of the fuse links and at least one of the bus bars are formed from the same conductive material comprising:

a central conduction member;

a plurality of terminals adapted to be connected to the electrical conductors; and a plurality of said fuse links, each projecting from the central conduction member and terminating in one of the terminals, whereby the plurality of batteries are charged simultaneously in parallel connection.

14. The battery charger of claim 13 wherein the fuse links further comprise a conductive member adapted to provide an open circuit and become nonconductive in response to a current greater than approximately 200 amperes.

15. The battery charger of claim 13 further comprising a transparent cover over said fuse link and over a portion of the bus bar formed from the same conductive material as said fuse link, whereby a user is protected from said fuse link and may visually inspect the condition of said fuse link.

16. A battery charger for charging a plurality of batteries, each having a positive and a negative terminal, said charger comprising:

a power supply having positive and negative terminals;

a positive bus bar;

a negative bus bar;

means for connective the positive terminal of the power supply to the positive bus bar;

means for connecting the negative terminal of the power supply to the negative bus bar;

a plurality of positive connector means, each said positive connector means corresponding to one of the plurality of batteries for separately connecting the positive bus bar to the positive terminal of the corresponding battery; and a plurality of negative connector means, each said negative connector means corresponding to one of the plurality of batteries for separately connecting the negative bus bar to the negative terminal of the corresponding battery;

wherein at least some of the positive and negative connector means each comprise:

means for engaging a terminal on a battery; and electrical conductor; and a fuse link in series with the electrical conductor, said conductor and said link connected between the engaging means and the bus bar; and wherein at least one of said bus bars and one of said fuse links are formed from the same conductive material; and a transparent cover over said fuse link and over a portion of the bus bar formed from the same conductive material as said fuse link wherein the transparent cover includes a flange to which each of the engaging means may be mechanically connected when not in use, whereby a user is protected from said fuse link and may visually inspect the condition of said fuse link, whereby each of the engaging means may be safely stored and electrically insulated from each other, and whereby the plurality of batteries are charged simultaneously in parallel connection.

17. The battery charger of claim 13 wherein the fuse links further comprise a plurality of conductors connected in parallel.

18. The battery charger of claim 13 wherein the conductive material further comprises a long bar with a plurality of fuse links projecting transversely, the fuse links further comprising a plurality of fusible members connected in parallel between the central conduction member and the terminal, wherein the fuse links and the bus bar are formed from a single piece of conductive material.

* * * * *